US011881032B2

(12) United States Patent
Yang et al.

(10) Patent No.: US 11,881,032 B2
(45) Date of Patent: Jan. 23, 2024

(54) DEVICE AND METHOD FOR SEARCHING PARKING SPACE

(71) Applicants: HYUNDAI MOTOR COMPANY, Seoul (KR); Kia Corporation, Seoul (KR)

(72) Inventors: Junho Yang, Seongnam-si (KR); Donghee Kang, Seongnam-si (KR); Kyujin Park, Namyangju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 165 days.

(21) Appl. No.: 17/527,610

(22) Filed: Nov. 16, 2021

(65) Prior Publication Data

US 2022/0350994 A1 Nov. 3, 2022

(30) Foreign Application Priority Data

May 3, 2021 (KR) .......................... 10-2021-0057385

(51) Int. Cl.
| | |
|---|---|
| G06V 20/58 | (2022.01) |
| G08G 1/14 | (2006.01) |
| G06N 3/08 | (2023.01) |
| G01C 21/00 | (2006.01) |
| G01C 21/34 | (2006.01) |

(52) U.S. Cl.
CPC ....... *G06V 20/586* (2022.01); *G01C 21/3453* (2013.01); *G01C 21/3811* (2020.08); *G01C 21/3837* (2020.08); *G06N 3/08* (2013.01); *G08G 1/143* (2013.01); *G08G 1/146* (2013.01)

(58) Field of Classification Search
None
See application file for complete search history.

(56) References Cited

U.S. PATENT DOCUMENTS

| | | | |
|---|---|---|---|
| 9,796,381 B2 | 10/2017 | Jung et al. | |
| 2014/0122190 A1* | 5/2014 | Wolfson | G08G 1/144 705/13 |
| 2021/0213939 A1* | 7/2021 | Woo | B60W 50/14 |

* cited by examiner

*Primary Examiner* — Thomas S Mccormack
(74) *Attorney, Agent, or Firm* — MORGAN, LEWIS & BOCKIUS LLP (57) ABSTRACT

A device for searching a parking space includes at least one space detection sensor mounted on a vehicle, and a controller that analyzes sensed information obtained through the space detection sensor to recognize space and object information within a parking lot, predicts a distribution of available parking spaces in the parking lot based on the recognized space and object information, and determines an optimal available parking space based on the distribution of the available parking spaces and characteristics of a driver.

9 Claims, 12 Drawing Sheets

DEVICE AND METHOD FOR SEARCHING PARKING SPACE

CROSS-REFERENCE TO RELATED APPLICATION

This application claims the benefit of priority to Korean Patent Application No. 10-2021-0057385, filed on May 3, 2021 with the Korean Intellectual Property Office, the entire contents of which are incorporated herein by reference.

TECHNICAL FIELD

The present disclosure relates to a device and a method for searching a parking space.

BACKGROUND

Recently, as a vehicle penetration rate is greatly expanded and a usage rate is rapidly increased, the number and a scale of parking lots are increased. Thus, a time consumed for parking has gradually increased.

Accordingly, a shopping mall, a large mart, and the like are making effort to reduce inconvenience of a driver by constructing an infrastructure that provides information on an available parking space in the parking lot and providing the infrastructure to the driver.

However, most drivers still have to complete parking by driving a vehicle directly to the available parking space. Conventionally, the driver identified the parking space using the parking lot infrastructure or a marker.

In an environment in which the parking lot infrastructure or the marker is not constructed, or when parking lot infrastructure communication is not smooth, it is not possible to identify the available parking space, so that a lot of time is spent until the parking is completed in the parking lot.

Even when there is the available parking space, there are many cases in which the corresponding space is far from moving lines of most users, so that the drivers often perform the parking with inconvenience that the available parking space does not match the moving line.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a device and a method for searching a parking space that may predict a distribution of available parking spaces in a parking lot with Gaussian process regression while searching the available parking space using an antero-lateral LiDar, an omnidirectional camera, an ultrasonic sensor, and the like installed in a vehicle during autonomous parking, may park the vehicle at a location at which convenience of a driver is considered by searching the available parking space with an optimal route based on the predicted distribution, and utilize a sensor mounted in the vehicle when searching the available parking space, thereby efficiently performing the autonomous parking even in a parking lot where a parking lot infrastructure is not constructed.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for searching a parking space includes at least one space detection sensor mounted on a vehicle, and a controller that analyzes sensed information obtained through the at least one space detection sensor to recognize space and object information within a parking lot, predicts a distribution of available parking spaces in the parking lot based on the recognized space and object information, and determines an optimal available parking space based on the distribution of the available parking spaces and characteristics of a driver.

In one implementation, the at least one space detection sensor may include at least one of a camera, a LiDar, or an ultrasonic sensor.

In one implementation, the controller may analyze the sensed information obtained through the at least one space detection sensor of the vehicle to generate a parking lot partial map including a parking line, locations of parked vehicles, and a location of a host vehicle.

In one implementation, the controller may select a recognized road in the parking lot partial map as a travelable space, select an intersection or a turning point in the parking lot partial map as a fixed node, select a boarding and alighting node at a driver boarding and alighting location in the parking lot partial map, and select a cart node at a cart storage in the parking lot partial map.

In one implementation, the controller may reflect an available parking space among the available parking spaces recognized while the vehicle travels to the travelable space in the parking lot partial map, assign a weight accordingly when the available parking spaces are successively recognized, and reflect the weight on the parking lot partial map, and select a parking space node on a travelable space closest to the available parking space.

In one implementation, the controller may determine the optimal available parking space in consideration of a location of the available parking space by the parking space node, the driver boarding and alighting location by the boarding and alighting node, or a location of the cart storage by the cart node.

In one implementation, the controller may determine an available parking space among the available parking spaces with the lowest cost function after setting a location of the parking space node, a location of the boarding and alighting node, and a location of the cart node as model inputs for convolutional neural network calculation as an optimal parking space.

According to another aspect of the present disclosure, a method for searching a parking space includes analyzing sensed information obtained through a space detection sensor including at least one of a camera, a LiDar, or an ultrasonic sensor installed in a vehicle to recognize space and object information within a parking lot, predicting a distribution of available parking spaces in the parking lot based on the recognized space and object information, and determining an optimal available parking space based on the distribution of the available parking spaces and characteristics of a driver.

In one implementation, the analyzing of sensed information obtained through the space detection sensor including at least one of the camera, the LiDar, or the ultrasonic sensor installed in the vehicle to recognize space and object information within the parking lot may include analyzing the sensed information obtained through the space detection sensor of the vehicle to generate a parking lot partial map including a parking line, locations of parked vehicles, and a location of a host vehicle.

In one implementation, the predicting of the distribution of the available parking spaces in the parking lot based on the recognized space and object information may include selecting a recognized road in the parking lot partial map as a travelable space, selecting an intersection or a turning point in the parking lot partial map as a fixed node, selecting a boarding and alighting node at a driver boarding and alighting location in the parking lot partial map, and selecting a cart node at a cart storage in the parking lot partial map.

In one implementation, the predicting of the distribution of the available parking spaces in the parking lot based on the recognized space and object information may include reflecting an available parking space among the available parking spaces recognized while the vehicle travels to the travelable space in the parking lot partial map, assigning a weight accordingly when the available parking spaces are successively recognized, and reflecting the weight on the parking lot partial map, and selecting a parking space node on a travelable space closest to the available parking space.

In one implementation, the determining of the optimal available parking space based on the distribution of the available parking spaces and the characteristics of the driver may include determining the optimal available parking space in consideration of a location of the available parking space by the parking space node, the driver boarding and alighting location by the boarding and alighting node, or a location of the cart storage by the cart node.

In one implementation, the determining of the optimal available parking space based on the distribution of the available parking spaces and the characteristics of the driver may include determining an available parking space among the available parking spaces with the lowest cost function after setting a location of the parking space node, a location of the boarding and alighting node, and a location of the cart node as model inputs for convolutional neural network calculation as an optimal parking space.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, various embodiments of the present disclosure are described with reference to the accompanying drawings. However, this is not intended to limit the present disclosure to specific embodiments, and it should be understood to include various modifications, equivalents, and/or alternatives of embodiments of the present disclosure.

The various embodiments of the present document and the terms used therein are not intended to limit the technical features described in the present document to specific embodiments, and it should be understood to cover various modifications, equivalents, or substitutions of the corresponding embodiment.

In connection with the description of the drawings, like reference numerals may be used for similar or related components. The singular form of the noun corresponding to the item may include one or a plurality of items, unless the relevant context clearly dictates otherwise.

In the present document, each of the phrases such as "A or B", "at least one of A and B", "at least one of A or B", "A, B, or C", "at least one of A, B, and C", and "at least one of A, B, or C" may include any one of or all possible combinations of items listed together in the corresponding one of the phrases.

Terms such as "first" and "second" may be used simply to distinguish one component from another, and may not limit the corresponding components in other aspects (e.g., an importance or an order). When it is mentioned that one (e.g., first) component is "coupled" or "connected" to another (e.g., second) component, with or without the terms "functionally" or "communicatively", it means that the one component may be connected to another component directly (e.g., by wire), wirelessly, or via a third component.

Various embodiments of the present document may be implemented with software (e.g., a program) including one or more instructions stored in a machine-readable storage medium (e.g., an internal memory or an external memory). For example, the machine may call at least one of the stored one or more instructions from the storage medium and execute the at least one instruction. This enables the machine to be operated to perform at least one function based on the at least one instruction called. The one or more instructions may include a code generated by a compiler or a code executable by an interpreter.

The machine-readable storage medium may be provided in a form of a non-transitory storage medium. Herein, the 'non-transitory' only means that the storage medium is a tangible device and does not contain a signal (e.g., an electromagnetic wave). This term does not distinguish between cases where data is stored semi-permanently on the storage medium and cases where data is temporarily stored.

According to one embodiment, the method according to various embodiments disclosed in the present document may be provided by being included in a computer program product. The computer program product may be traded between sellers and buyers as a commodity. The computer program product may be distributed in a form of the machine-readable storage medium (e.g., a compact disc read only memory (CD-ROM)), or distributed (e.g., downloaded or uploaded) online via an application store or directly between two user devices. In the case of the online distribution, at least a portion of the computer program product may be temporarily stored or temporarily created in the machine-readable storage medium such as a memory of a server of a manufacturer, a server of the application store, or a relay server.

According to various embodiments, each (e.g., a module or a program) of the above-described components may include a singular or a plurality of entities, and some of the plurality of entities may be separately disposed on another component.

According to various embodiments, one or more of the aforementioned components or operations may be omitted, or one or more other components or operations may be added.

Alternatively or additionally, a plurality of components (e.g., the module or the program) may be integrated into one component. In this case, the integrated component may perform one or more functions of each of the plurality of components identically or similarly to those performed by the corresponding component among the plurality of components prior to the integration.

According to various embodiments, operations performed by the module, the program, or another component may be executed sequentially, in parallel, repeatedly, or heuristically, one or more of the above operations may be executed in a different order or may be omitted, or one or more other operations may be added.

Figure 1:
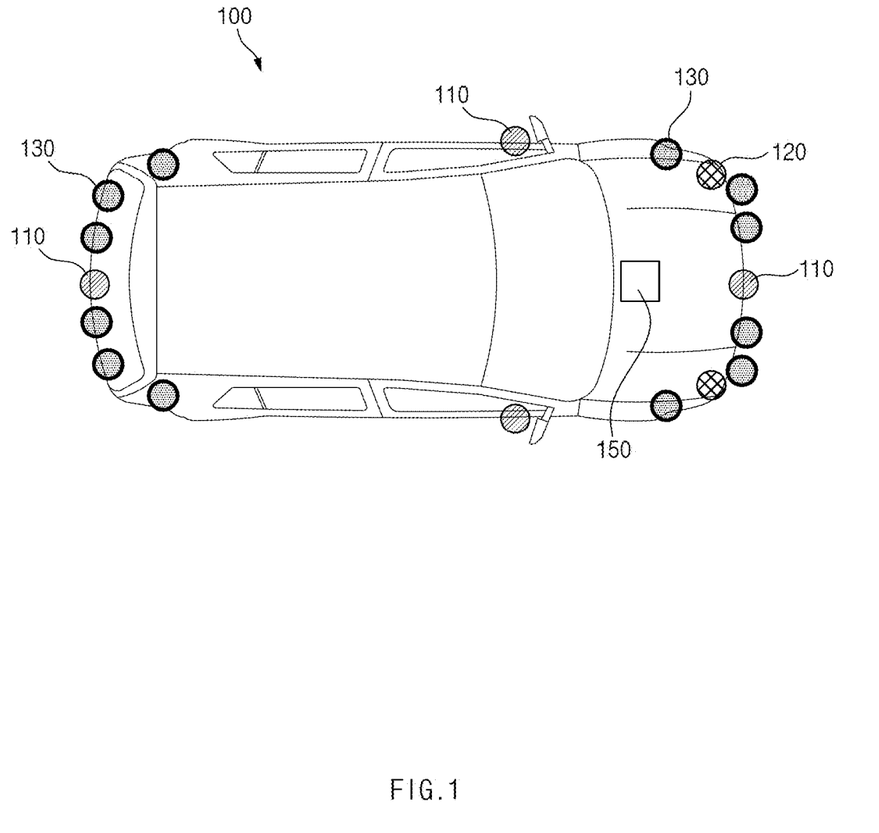
FIG. 1 is a block diagram showing a vehicle having a parking space search device according to an exemplary embodiment of the present disclosure.
Figure 2:
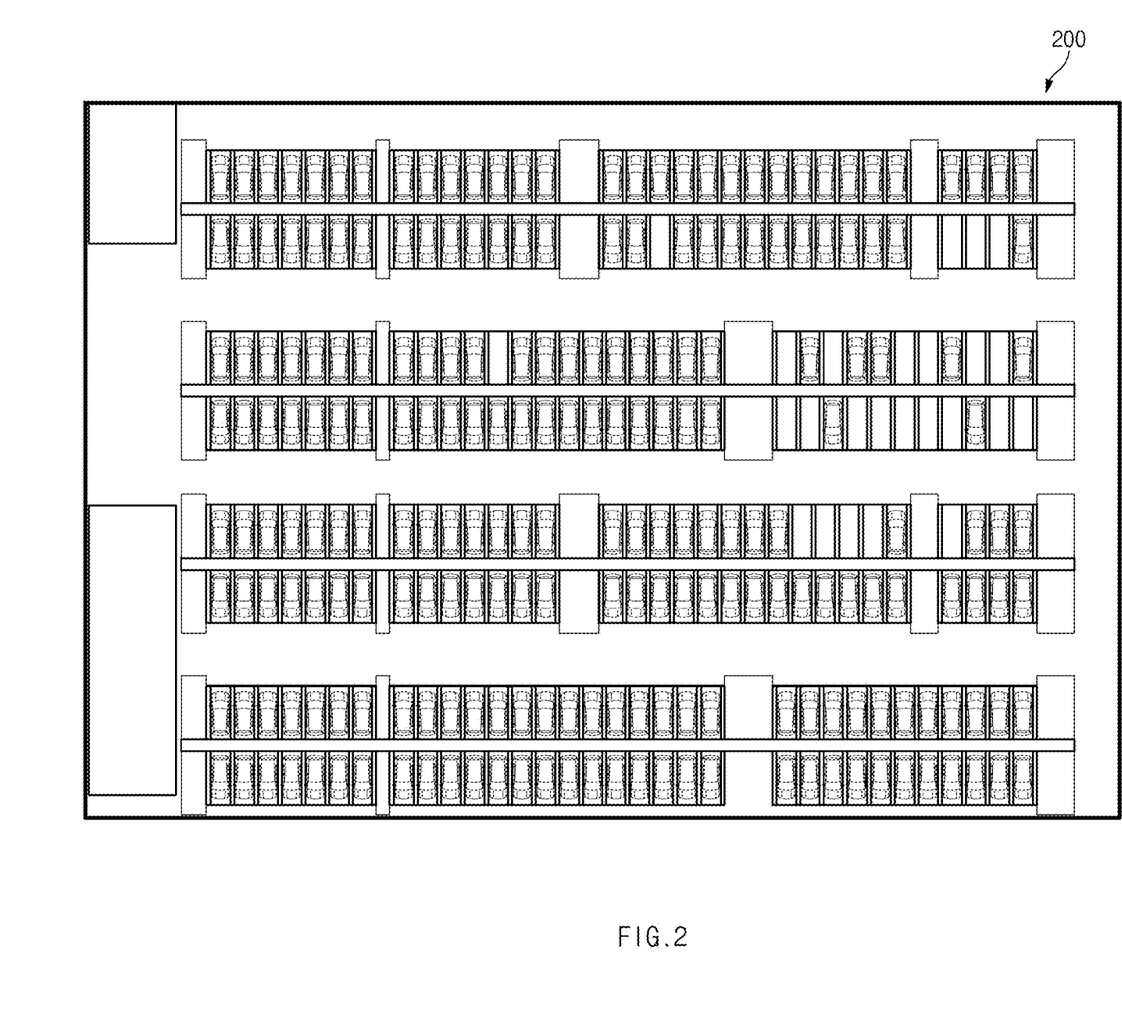
FIG. 2 is a diagram showing a parking lot for searching a parking space according to an exemplary embodiment of the present disclosure.

FIG. 1 is a block diagram showing a vehicle having a parking space search device according to an exemplary embodiment of the present disclosure, and FIG. 2 is a diagram showing a parking lot for searching a parking space according to an exemplary embodiment of the present disclosure.

Referring to FIGS. 1 and 2, a parking space search device according to an exemplary embodiment of the present disclosure may include a camera 110, a LiDar 120, an ultrasonic sensor 130, and a controller 150.

The camera 110 includes four cameras respectively installed on a front portion, a rear portion, a left portion, and a right portion of a host vehicle 100 to film all directions.

The LiDar 120 includes two LiDars respectively installed on a front left portion and a front right portion of the host vehicle 100 to sense an object disposed in an antero-lateral region.

The ultrasonic sensor 130 includes six ultrasonic sensors installed on each of the front portion and the rear portion of the host vehicle 100 to sense each of objects in regions in front of and at the rear of the host vehicle 100.

The controller 150 of the parking space search device according to an exemplary embodiment of the present disclosure may be a processor (e.g., computer, microprocessor, CPU, ASIC, circuitry, logic circuits, etc.). The controller 150 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The controller 150 may perform spatial recognition and object recognition within a parking lot 200 by analyzing sensed information obtained through a space detection sensor such as the camera 110, the LiDar 120, the ultrasonic sensor 130, or the like, predict distribution of available parking spaces in the parking lot 200 based on the information on the recognized space and object, and determine an optimal available parking space based on the distribution of the available parking spaces and characteristics of a driver.

When the host vehicle 100 enters the parking lot 200 and the driver alights, autonomous parking may be started.

Figure 3:
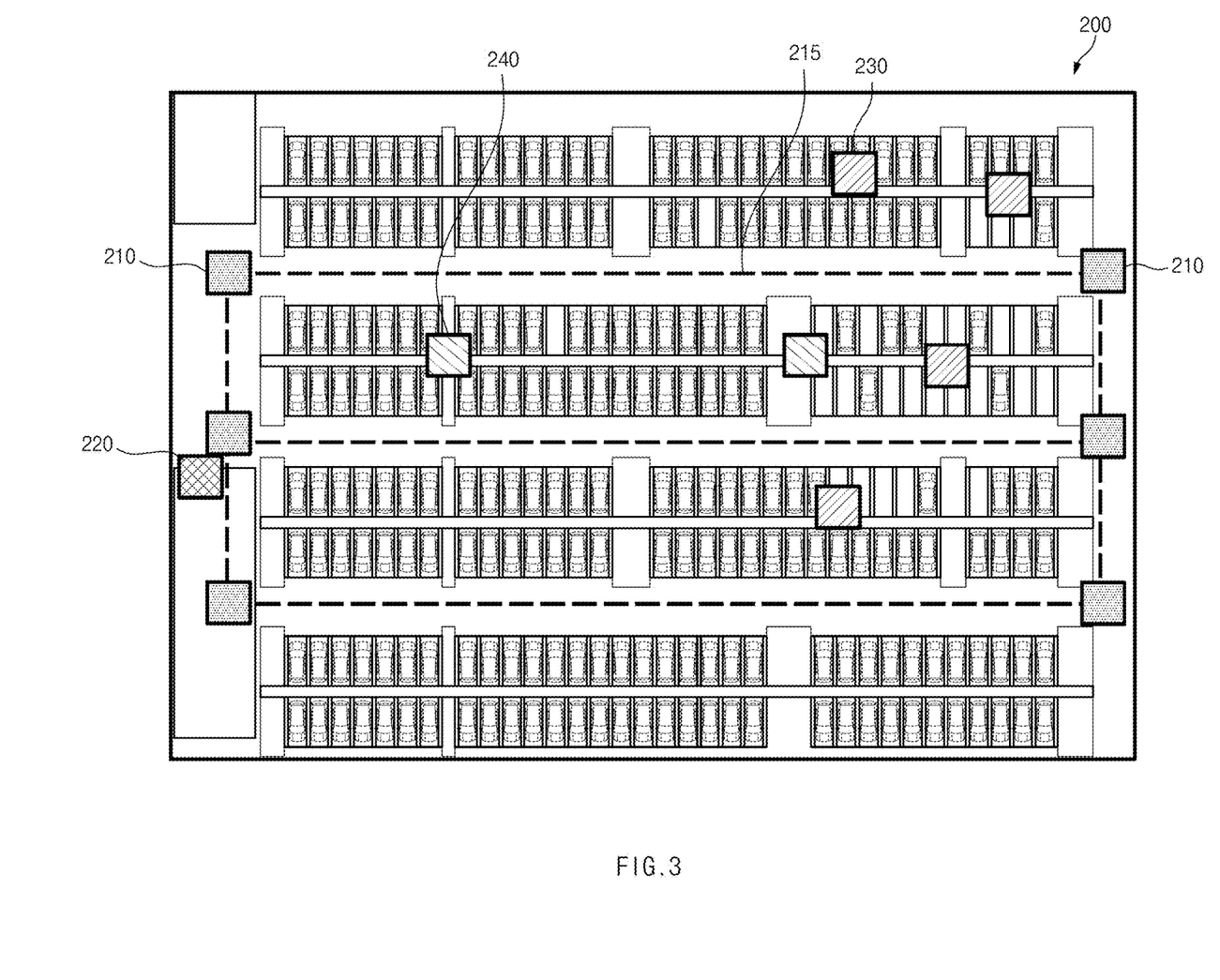
FIG. 3 is a diagram showing a parking lot partial map generation process for searching a parking space according to an exemplary embodiment of the present disclosure.

Referring to FIG. 3, the controller 150 may generate a parking lot partial map after searching the parking lot 200 while allowing the host vehicle 100 to travel to detect the available parking space in the parking lot 200.

The controller 150 may recognize parked vehicles and parking lines from an image of the camera 110 to generate a parking line-based map and then estimate a location of the host vehicle 100 in the map, generate an occupancy map by measuring locations of the parked vehicles with the LiDar 120 and then correct the location of the host vehicle 100 in the map, and update the map by measuring a blind region of the LiDar 120 in the occupancy map with the ultrasonic sensor 130 and then generate the parking lot partial map.

The controller 150 may specify a road or a region near the parking line recognized while allowing the host vehicle 100 to travel as a travel route 215, and may specify an intersection or a turning point as a fixed node 210. In addition, the controller 150 may specify an available parking space 230 in which parking is possible recognized while allowing the host vehicle 100 to travel, a boarding and alighting location (an entrance) 220 where the driver alights the host vehicle 100, and a cart location 240 where carts are stored.

Figure 4:
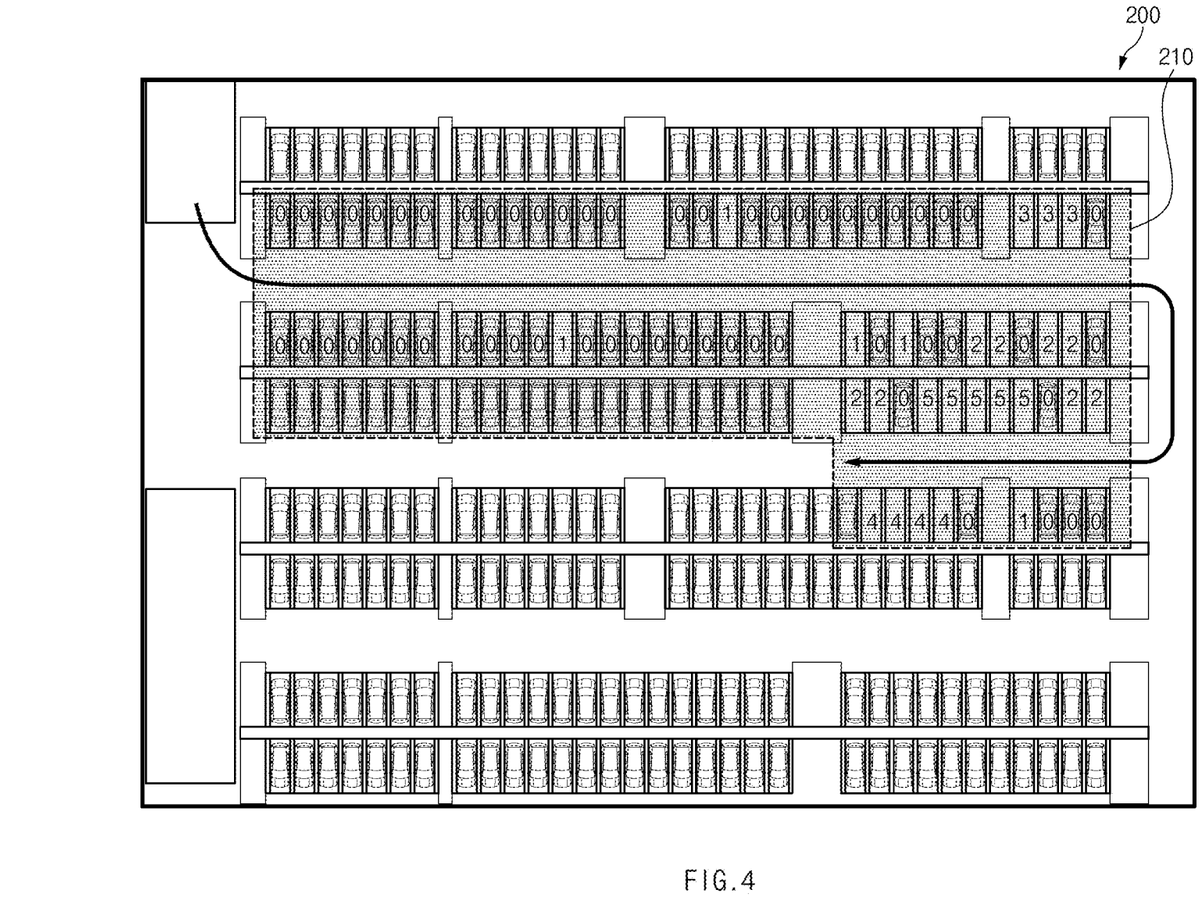
FIGS. 4 to 6 are diagrams showing a parking space search process according to an exemplary embodiment of the present disclosure.
Figure 5:
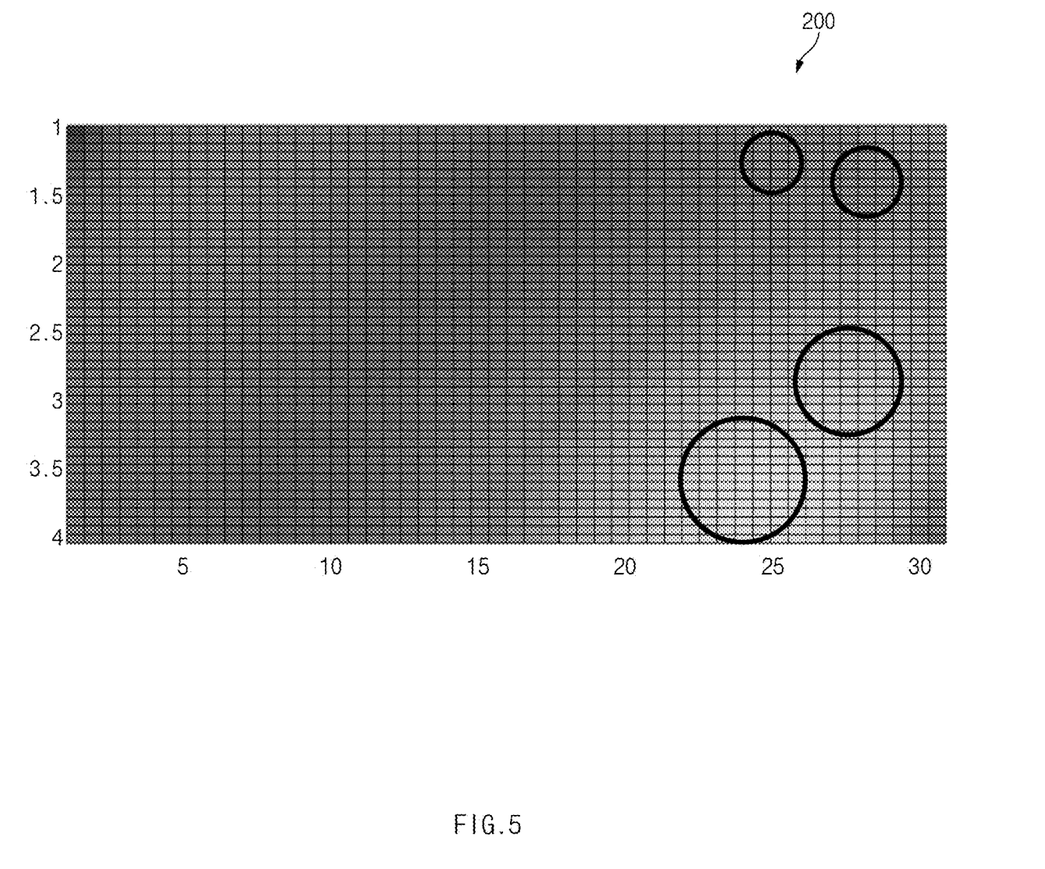
Figure 6:
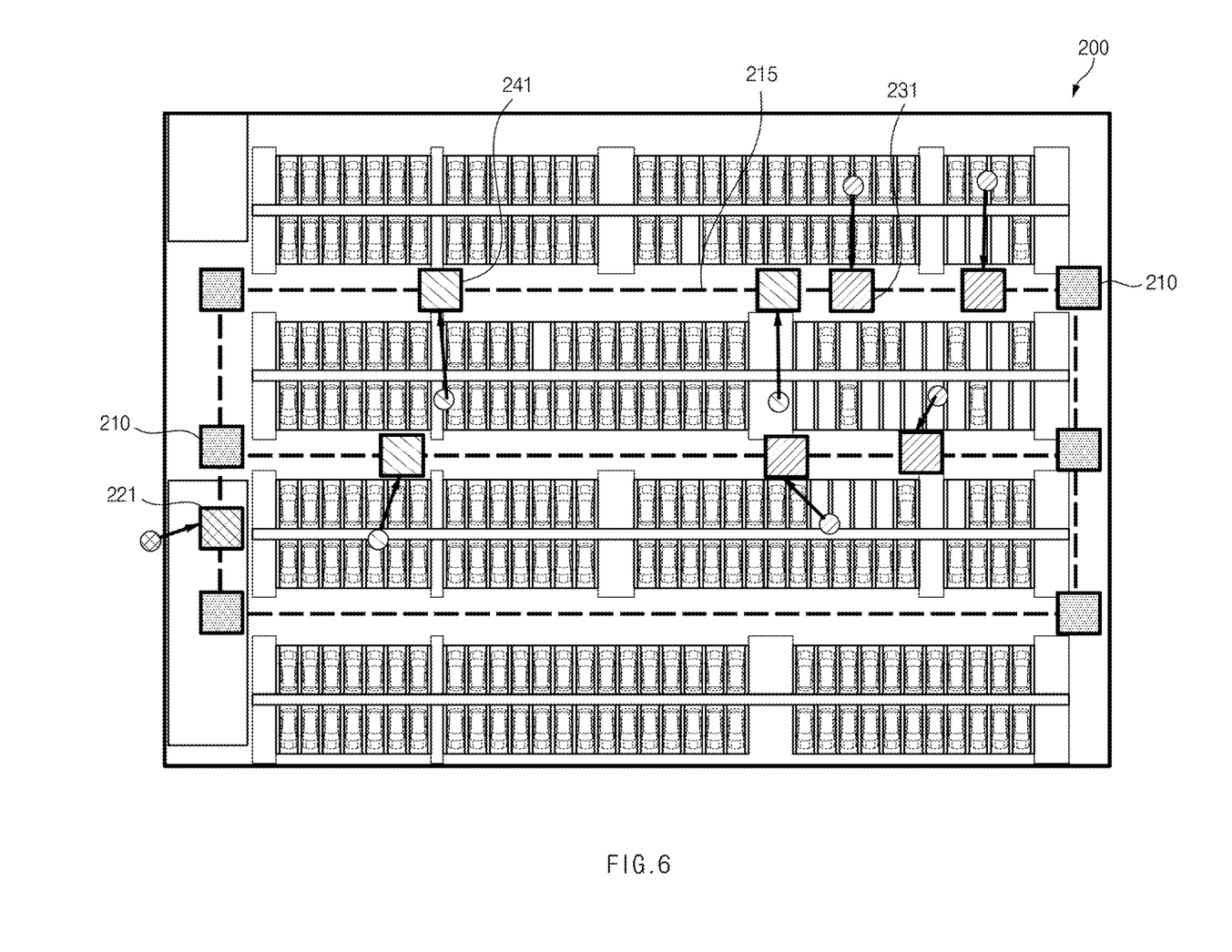

FIGS. 4 to 6 are diagrams showing a parking space search process according to an exemplary embodiment of the present disclosure.

The controller 150 may predict the distribution of the available parking spaces within the parking lot 200 based on the parking lot partial map.

Referring to FIG. 4, the controller 150 may reflect, on the parking lot partial map, the available parking space 230 recognized in the search region 210 while the host vehicle 100 travels along the travel route 215. When successively recognizing the available parking spaces 230, the controller 150 may assign a weight accordingly, and reflect the weight on the parking lot partial map.

For example, 1 may be marked at a corresponding location when the single available parking space 230 exists, 2 may be marked at all of two corresponding locations when the two available parking spaces 230 exist in a successive manner, 3 may be marked at all of three corresponding locations when the three available parking spaces 230 exist in a successive manner, 4 may be marked at all of four corresponding locations when the four available parking spaces 230 exist in a successive manner, and 5 may be marked at all of five corresponding locations when the five available parking spaces 230 exist in a successive manner.

In addition, the prediction on the distribution of the available parking spaces may be performed based on Gaussian process regression.

First, coordinates may be assigned to each of parking surfaces in the parking lot 200. When other vehicles are parked at i-th coordinates $x_i=(x_i, y_i)$, the i-th coordinates may be updated with data $z_i=0$.

Subsequently, when the available parking space 230 is recognized, the i-th coordinates may be updated with $z_i=1$ to be expanded with a parking lot partial map dataset $z=(z_1, z_2, \ldots, z_N)$.

When j available parking spaces 230 exist in a successive manner, the i-th coordinates may be updated with $z_i=j$, which is the number of successive parking spaces of $z_i$, to assign a weight for the available parking space 230.

In one example, when a preceding vehicle that has searched the parking lot 200 ahead of time t provides the parking lot partial map, corresponding data may be received from a cloud server (not shown) and used as an initial value of the dataset z.

Then, the parking lot partial map dataset may be input as the data of the Gaussian process regression. With reference to Mathematical Equation 1, the available parking space may be predicted by assuming a multivariate joint Gaussian distribution with a mean μ and a variance $\sigma^2$.

$$\mu = \kappa^T(\sigma_w^2 I + K)^{-1} z$$

$$\sigma^2 = c - \kappa^T(\sigma_w^2 I + K)^{-1} \kappa \quad \text{[Mathematical Equation 1]}$$

Here, $\sigma_w^2$ is an observed noise variance, K is a covariance between the available parking space and a predicted value of a predicted location, and c is a variance at the predicted location.

K, which is a kernel function of the available parking space, may be defined as Mathematical Equation 2 for a hyperparameter $\theta = \{\theta_0, \theta_1, \theta_2, \theta_3\}$ and two points (x, x').

$$K = \theta_0 \exp\left(-\frac{\theta_1}{2}\|x - x'\|^2\right) + \theta_2 + \theta_3 x^T x' \quad \text{[Mathematical Equation 2]}$$

Then, the available parking space may be predicted with a distribution with the mean μ and the variance $\sigma^2$ by calculating the hyperparameter θ where a sum of a standard normal distribution $(z_i - \mu)/\sigma$ is minimized, the observed noise variance $\sigma_w^2$, and the covariance K.

FIG. 5 shows the distribution of the available parking space. It may be seen that a large amount of available parking spaces are distributed at locations with a relatively bright color.

Then, referring to FIG. 6, a node may be created on the travel route 215 closest to a region of the available parking space 230 in the parking lot partial map and selected as a parking space node 231.

In this connection, when the parking space node 231 is selected, a spacing between the nodes may be set to be equal to or greater than a specific distance d.

In one example, when the parking lot partial map is provided from the cloud server, and when the spacing d of the parking space node 231 is selected, d (e.g., $d = \sqrt{S}/\sqrt{N_{node}} - 1$) may be set in consideration of an area S of the parking lot partial map.

In addition, a node may be created on the travel route 215 closest to the boarding and alighting location 220 and selected as a boarding and alighting node 221. In addition, a node may be created on the travel route 215 closest to the cart location 240 and selected as a cart node 241.

Then, referring to Mathematical Equation 3, an occupancy $G(n_k)$ of each parking space node $n_k$ may be calculated as a reciprocal of a probability $\mu_p(n_k)$ that there is the available parking space.

$$G(n_k) = = 1/\mu_p(n_k) \quad \text{[Mathematical Equation 3]}$$

FIGS. 7 to 11 are diagrams showing a process of selecting an optimal parking space through a parking space search process according to an exemplary embodiment of the present disclosure.

This is for optimizing an available parking space search moving line, and may include a case of using autonomous exit and call functions, and a case of not using the autonomous exit and call functions in consideration of congestion of the boarding and alighting location.

First, as the case of using the autonomous exit and call functions, the optimal available parking space may be determined based on a possibility that there is the available parking space and a proximity to the boarding and alighting location as a top priority. In this connection, even when the available parking space is recognized, the available parking space may be continuously searched when the proximity to the boarding and alighting location is equal to or lower than a predetermined standard.

A minimum travel distance $A^*(n_k)$ from the boarding and alighting node to a k-th parking space node may be calculated with A* algorithm, and the k-th parking space node with the smallest cost function may be selected as a target parking location by Mathematical Equation 4.

$$J(n_k) = (1-\alpha) \cdot G(n_k) + \alpha \cdot A^*(n_k) \quad \text{[Mathematical Equation 4]}$$

In addition, in the case of not using the autonomous exit and call functions, the optimal available parking space may be determined based on the possibility that there is the available parking space and proximities to the boarding and alighting location and the cart location as the top priority.

In this connection, even when the available parking space is recognized, the available parking space may be continuously searched when the proximities to the boarding and alighting location and the cart location are equal to or lower than the predetermined standard.

Minimum travel distances $A_1^*(n_k)$ and $A_2^*(n_k)$ respectively from the boarding and alighting node and the cart node to the k-th parking space node may be calculated with the A* algorithm, and the k-th parking space node with the smallest cost function may be selected as the target parking location by Mathematical Equation 5.

$$J(n_k) = (1-\beta_1-\beta_2) \cdot G(n_k) + \beta_1 \cdot A_1^*(n_k) + \beta_2 \cdot A_2^*(n_k) \quad \text{[Mathematical Equation 5]}$$

As a model condition for optimizing a convolution multilayer neural network structure variable for optimizing the available parking space search moving line, a cost function for optimizing the available parking space search moving line may be calculated with an optimal variable of a convolution multilayer neural network structure because the cost function for optimizing the available parking space search moving line may be changed depending on a shape and a location of each available parking space.

In one example, when the parking lot may be distinguished by GPS location information, up to $N_{CNN}$ different convolution multilayer neural network models may be stored. When there is no saved GPS location information, the oldest convolution multilayer neural network model may be deleted and updated with a new model.

In addition, weight information of the neural network corresponding to a final result may be stored differently using models that have undergone different learning in the same form depending on whether the call function is used.

To generate input and output information as a learning process for optimizing the convolution multilayer neural network structure variable for optimizing the available parking space search moving line, available parking space recognition information of previous vehicles may be used as learning information.

Figure 7:
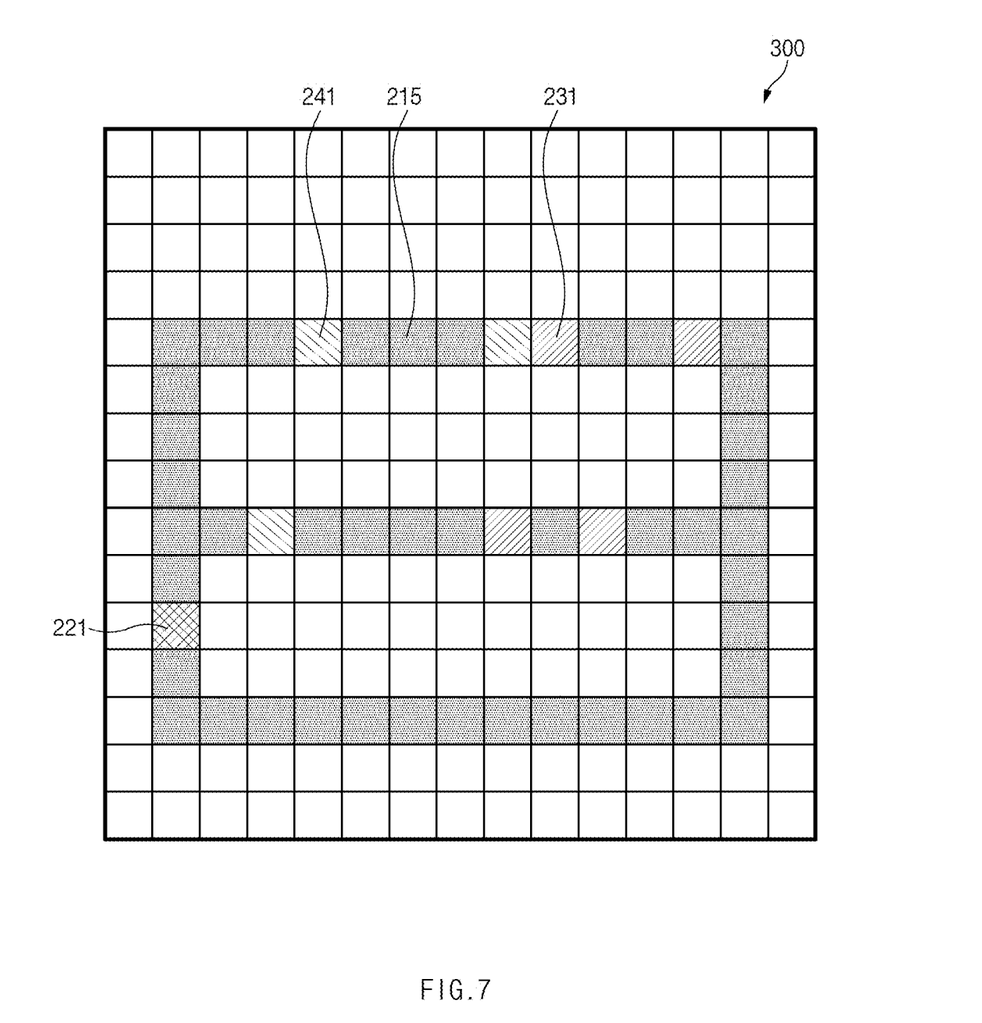
FIGS. 7 to 11 are diagrams showing a process of selecting an optimal parking space through a parking space search process according to an exemplary embodiment of the present disclosure.

Then, by adjusting α or $\beta_1$ and $\beta_2$, α or $\beta_1$ and $\beta_2$ minimizing a cost function of a final parking space node of the previous vehicle may be selected. Referring to FIG. 7, a two-dimensional grid map 300 connecting the boarding and alighting node 221, the parking space node 231, the cart node 241, and the fixed node 210 to the travel route 215 may be generated.

For model creation and learning as the learning process for optimizing the convolution multilayer neural network structure variable for optimizing the available parking space search moving line, after convolution operation in the two-dimensional grid map 300, final $\alpha$ or $\beta_{1,2}$ may be learned using the multilayer neural network structure.

The output variable $\alpha$ or $\beta_{1,2}$ used for the learning may be calculated based on the cost function for the final parking space node.

Figure 8:
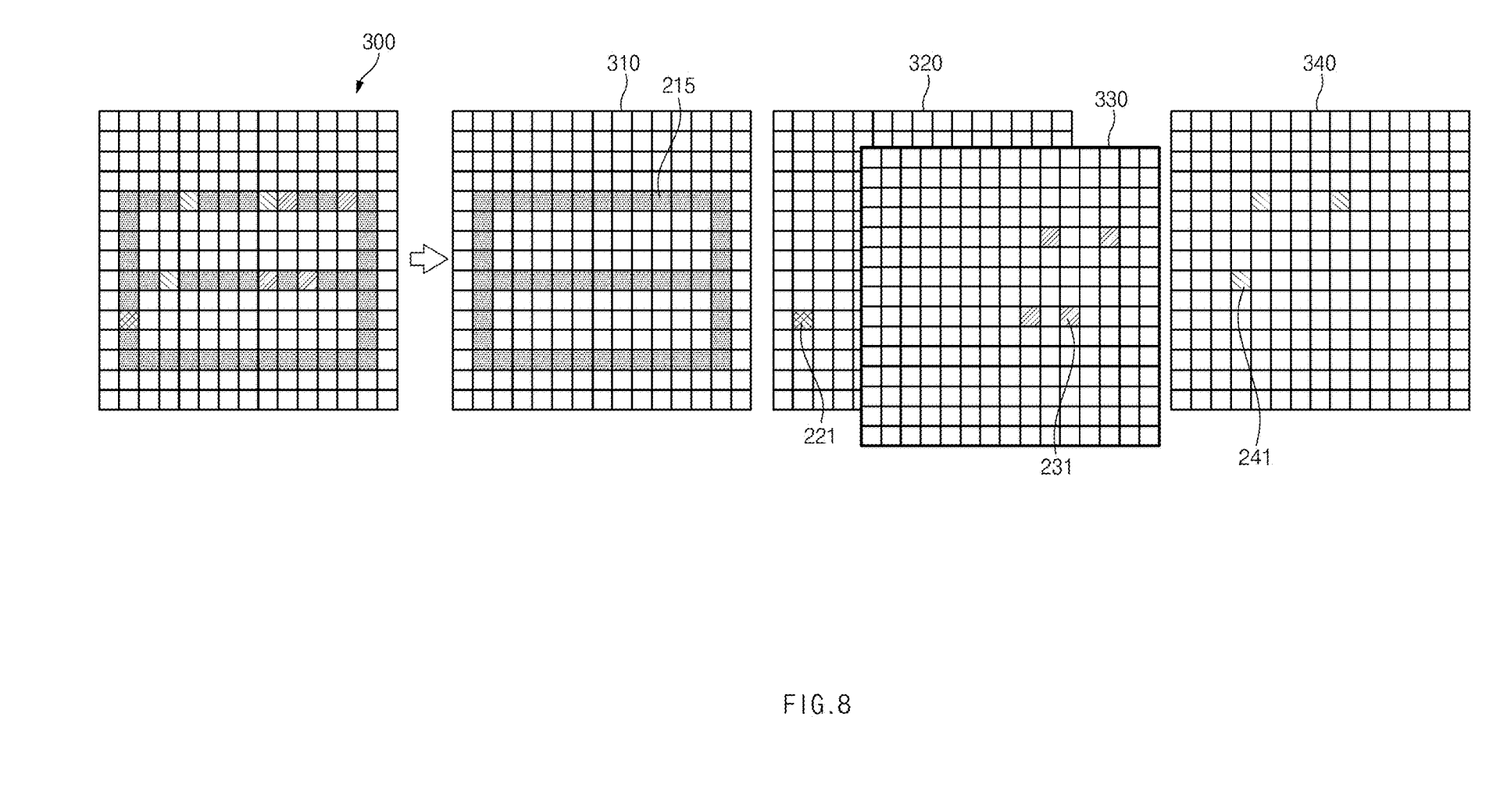
Figure 9:
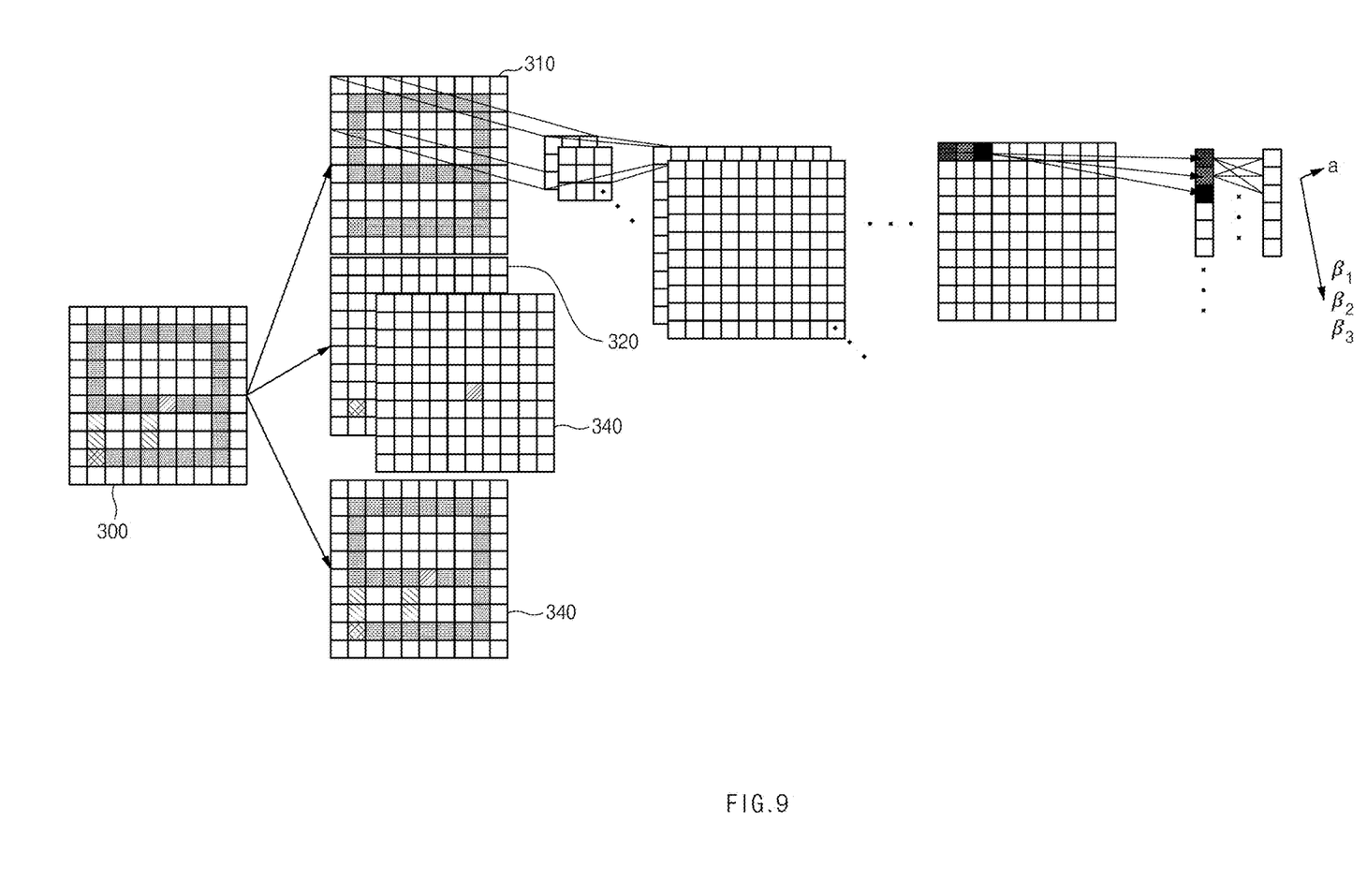

Referring to FIGS. 8 and 9, the two-dimensional grid map 300, which may be separated into independent inputs, may be separated into a first grid map 310 in which only the travel route 215 is input, a second grid map 320 in which only the boarding and alighting node 221 is input, a third grid map 330 in which only the parking space node 231 is input, and a fourth grid map 340 in which only the cart node 241 is input.

Figure 10:
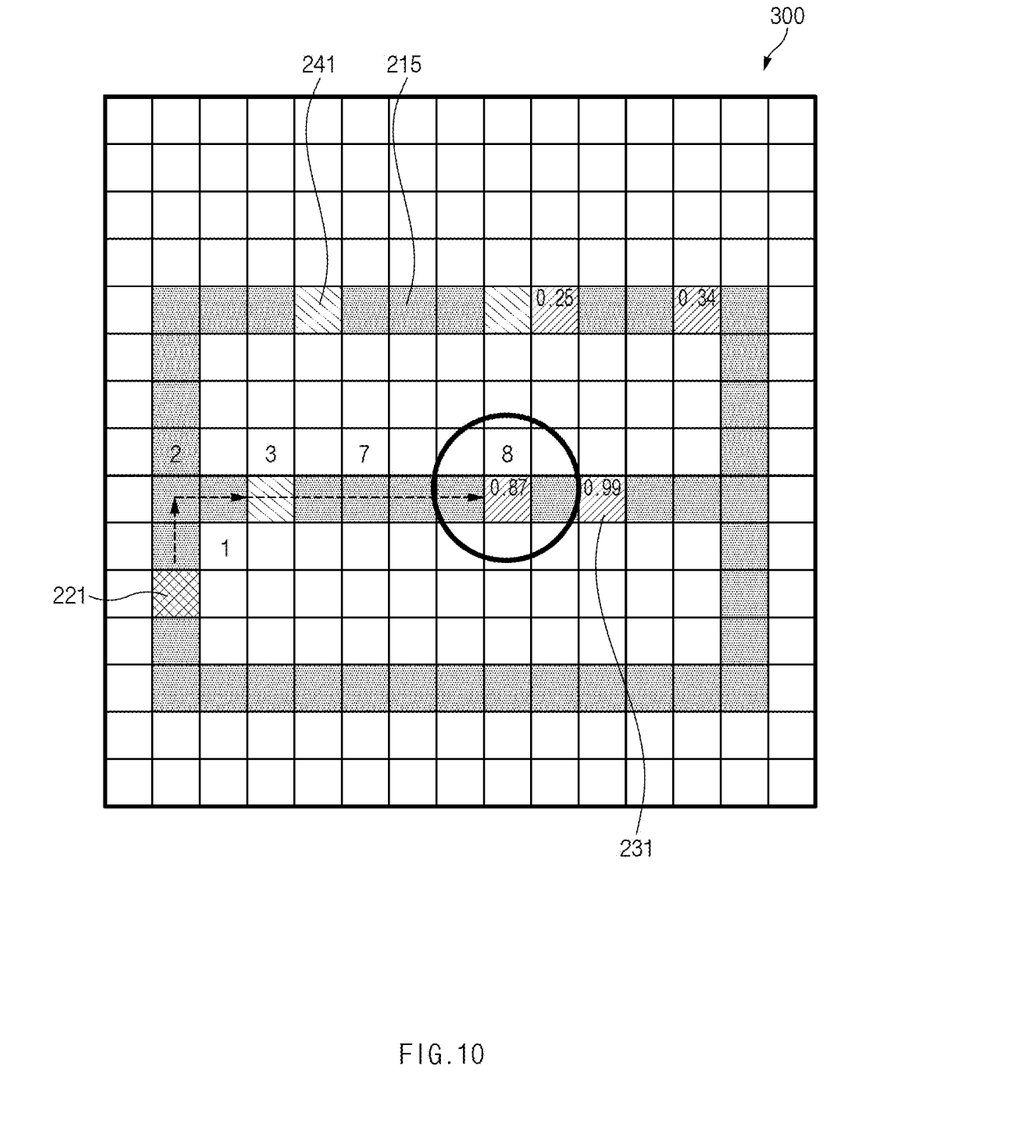

Subsequently, the convolutional neural network learning process may be performed to finally extract the variables $\alpha$ and $\beta_{1,2}$ required for the cost function.

The final cost function may be derived by summing a cost function value based on distances from the boarding and alighting node 221 to the parking space node 231 and the cart node 241 calculated through the A* algorithm, and a cost function value using the occupancy of the parking space node 231 calculated by a Gaussian process.

Figure 11:
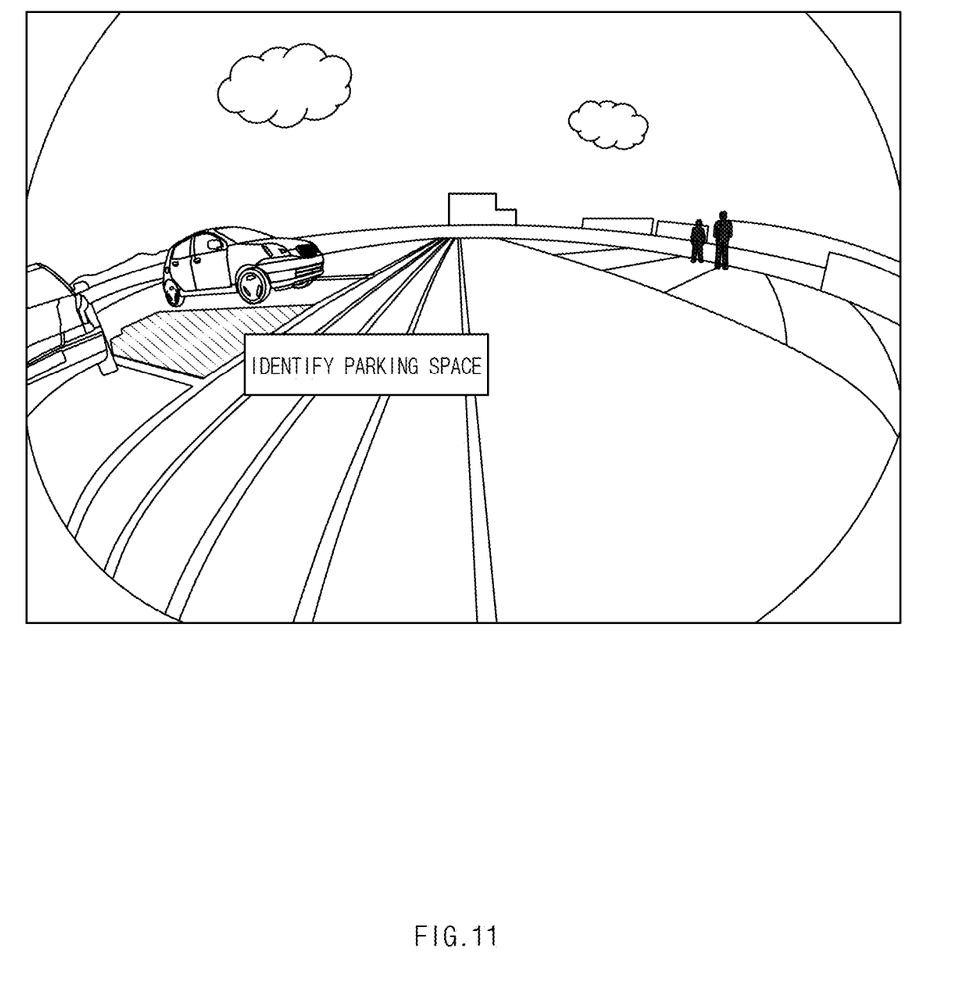

Subsequently, referring to FIG. 11, it is possible to perform parking control by moving to the parking space node 231 having the lowest cost function.

For example, although a location where the occupancy of the parking space node 231 is 0.99 is a place with many available parking spaces, a location with an occupancy of 0.87 that is relatively close to the boarding and alighting location may be selected as a final available parking space in consideration of the boarding and alighting location of the driver and the cart location together.

In addition, although not shown in the drawings, according to embodiments, the parking space search device may further include storage.

The storage may store a command for controlling the parking space search device, a control command code, control data, or user data. For example, the storage may include at least one of an application program, an operating system (OS), middleware, or a device driver.

The storage may include at least one of a volatile memory or a non-volatile memory.

The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like.

The non-volatile memory may include a read only memory (ROM), a programmable ROM (PROM), an electrically programmable ROM (EPROM), an electrically erasable programmable ROM (EEPROM), a flash memory, and the like.

The storage may further include a non-volatile medium such as a hard disk drive (HDD), a solid state disk (SSD), an embedded multi-media card (eMMC), and universal flash storage (UFS).

Hereinafter, a parking space search method according to another embodiment of the present disclosure will be described in detail with reference to FIG. 12.

Figure 12:
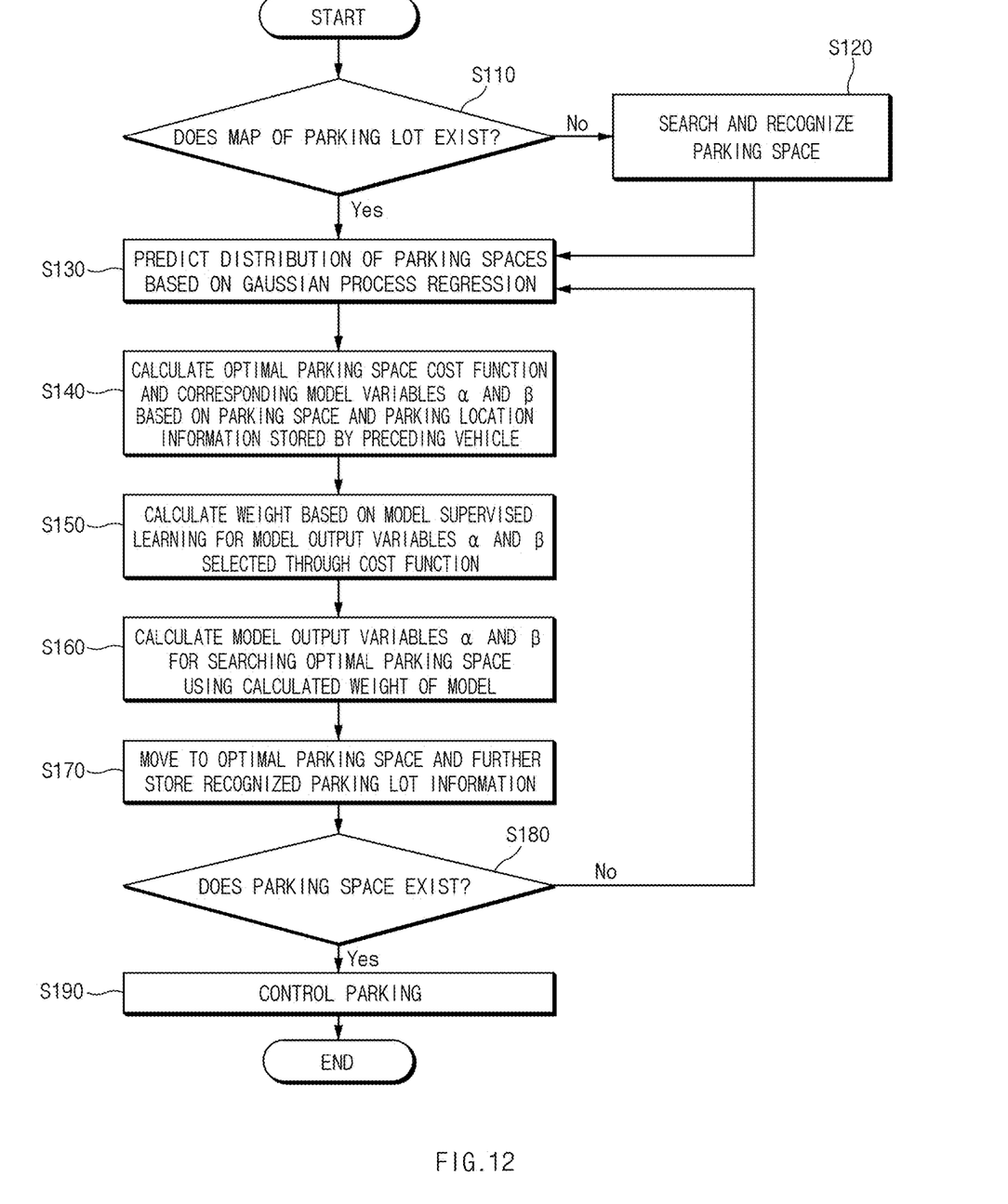
FIG. 12 is a flowchart for illustrating a parking space search method according to an exemplary embodiment of the present disclosure.

FIG. 12 is a flowchart for illustrating a parking space search method according to an embodiment of the present disclosure.

Hereinafter, it is assumed that the parking space search device in FIG. 1 performs the process in FIG. 12.

When the driver alights after the host vehicle 100 enters the parking lot 200, the controller 150 starts the autonomous parking. When a map of the parking lot 200 exists in the cloud server, the map may be received and used (S110).

When the map of the parking lot 200 does not exist, the spatial recognition and the object recognition within the parking lot 200 may be performed by analyzing the sensed information obtained through the camera 110, the LiDar 120, the ultrasonic sensor 130, or the like installed in the host vehicle 100 (S120).

For example, the parking lot partial map including the parking lines, the locations of the parked vehicles, and the location of the host vehicle 100 may be generated by analyzing the sensed information obtained through the camera 110, the LiDar 120, or the ultrasonic sensor 130 installed in the host vehicle 100.

Subsequently, the distribution of the available parking spaces within the parking lot 200 may be predicted based on the recognized space and object information (S130). The recognized road in the parking lot partial map may be selected as the travel route 215, the intersection or the turning point in the parking lot partial map may be selected as the fixed node 210, the boarding and alighting node 221 may be selected at the driver boarding and alighting location in the parking lot partial map, and the cart node 241 may be selected at a cart storage in the parking lot partial map (S140).

Subsequently, the available parking space recognized by the host vehicle 100 while traveling along the travel route 215 may be reflected to the parking lot partial map. When the available parking spaces are successively recognized, the weight may be assigned accordingly and reflected to the parking lot partial map. The parking space node 231 may be selected on the travel route 215 closest to the available parking space (S150).

Subsequently, the optimal available parking space may be determined based on the distribution of the available parking spaces and the characteristics of the driver. The optimal available parking space may be determined in consideration of the location of the available parking space by the parking space node 231, the driver boarding and alighting location by boarding and alighting node 221, or a cart storage location by the cart node 241 (S160).

For example, an available parking space with the lowest cost function after setting the parking space node location, the boarding and alighting node location, and the cart node location as model inputs for convolutional neural network calculation may be determined as the optimal parking space.

Subsequently, the vehicle may move to a parking space determined as the optimal available parking space, and the autonomous parking may be controlled to be performed when there is the parking space (S170).

In one example, when there is no parking space, the process may be repeatedly performed starting from operation 130 again.

As described above, according to the present disclosure, the distribution of the available parking spaces in the parking lot may be predicted with the Gaussian process regression while searching the available parking space using the antero-lateral LiDar, the omnidirectional camera, the ultrasonic sensor, and the like installed in the vehicle during the autonomous parking, the vehicle may be parked at the location at which the convenience of the driver is considered by searching the available parking space with the optimal route based on the predicted distribution, and the sensor mounted in the vehicle may be used when searching the available parking space, so that the autonomous parking may be efficiently performed even in the parking lot where the parking lot infrastructure is not constructed.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present technology may predict the distribution of the available parking spaces in the parking lot with the Gaussian process regression while searching the available parking space using the antero-lateral LiDar, the omnidirectional camera, the ultrasonic sensor, and the like installed in the vehicle during the autonomous parking, may park the vehicle at the location at which the convenience of the driver is considered by searching the available parking space with the optimal route based on the predicted distribution, and may utilize the sensor mounted in the vehicle when searching the available parking space, thereby efficiently performing the autonomous parking even in the parking lot where the parking lot infrastructure is not constructed.

In addition, various effects directly or indirectly identified through the present document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for searching a parking space, the device comprising:
   at least one space detection sensor mounted on a vehicle; and
   a controller configured to:
   analyze sensed information obtained through the at least one space detection sensor and to recognize space and object information within a parking lot;
   predict a distribution of available parking spaces in the parking lot based on the recognized space and object information; and
   determine an optimal available parking space based on the distribution of the available parking spaces and characteristics of a driver,
   wherein the controller is further configured to:
   analyze the sensed information obtained through the at least one space detection sensor of the vehicle and generate a parking lot partial map including a parking line, locations of parked vehicles, and a location of a host vehicle,
   select a recognized road in the parking lot partial map as a travelable space;
   reflect an available parking space among the available parking spaces recognized while the vehicle travels to the travelable space in the parking lot partial map,
   assign a weight accordingly when the available parking spaces are successively recognized, and reflect the weight on the parking lot partial map, and
   select a parking space node on a travelable space closest to the available parking space.

2. The device of claim 1, wherein the at least one space detection sensor includes at least one of a camera, a LiDar, or an ultrasonic sensor.

3. The device of claim 1, wherein the controller is further configured to:
   select an intersection or a turning point in the parking lot partial map as a fixed node;
   select a boarding and alighting node at a driver boarding and alighting location in the parking lot partial map; and
   select a cart node at a cart storage in the parking lot partial map.

4. The device of claim 3, wherein the controller is further configured to determine the optimal available parking space in consideration of a location of the available parking space by the parking space node, the driver boarding and alighting location by the boarding and alighting node, or a location of the cart storage by the cart node.

5. The device of claim 4, wherein the controller is further configured to determine an available parking space among the available parking spaces with the lowest cost function after setting a location of the parking space node, a location of the boarding and alighting node, and a location of the cart node as model inputs for convolutional neural network calculation as an optimal parking space.

6. A method for searching a parking space, the method comprising:
   analyzing sensed information obtained through a space detection sensor including at least one of a camera, a LiDar, or an ultrasonic sensor installed in a vehicle and recognizing space and object information within a parking lot;
   predicting a distribution of available parking spaces in the parking lot based on the recognized space and object information; and
   determining an optimal available parking space based on the distribution of the available parking spaces and characteristics of a driver,
   wherein the analyzing of sensed information obtained through the space detection sensor including at least one of the camera, the LiDar, or the ultrasonic sensor installed in the vehicle and recognizing space and object information within the parking lot includes:
   analyzing the sensed information obtained through the space detection sensor of the vehicle to generate a parking lot partial map including a parking line, locations of parked vehicles, and a location of a host vehicle, and
   wherein the predicting of the distribution of the available parking spaces in the parking lot based on the recognized space and object information includes:
   selecting a recognized road in the parking lot partial map as a travelable space;
   reflecting an available parking space among the available parking spaces recognized while the vehicle travels to the travelable space in the parking lot partial map;
   assigning a weight accordingly when the available parking spaces are successively recognized, and reflecting the weight on the parking lot partial map; and
   selecting a parking space node on a travelable space closest to the available parking space.

7. The method of claim 6, wherein the predicting of the distribution of the available parking spaces in the parking lot based on the recognized space and object information further includes:
   selecting an intersection or a turning point in the parking lot partial map as a fixed node;
   selecting a boarding and alighting node at a driver boarding and alighting location in the parking lot partial map; and
   selecting a cart node at a cart storage in the parking lot partial map.

8. The method of claim 7, wherein the determining of the optimal available parking space based on the distribution of the available parking spaces and the characteristics of the driver includes:
   determining the optimal available parking space in consideration of a location of the available parking space by the parking space node, the driver boarding and alighting location by the boarding and alighting node, or a location of the cart storage by the cart node.

9. The method of claim 8, wherein the determining of the optimal available parking space based on the distribution of the available parking spaces and the characteristics of the driver includes:
   determining an available parking space among the available parking spaces with the lowest cost function after setting a location of the parking space node, a location of the boarding and alighting node, and a location of the cart node as model inputs for convolutional neural network calculation as an optimal parking space.

\* \* \* \* \*